United States Patent

Leat

[15] 3,696,518

[45] Oct. 10, 1972

[54] VEHICLE DIRECTION SENSING AND STEERING SYSTEMS USING MAGNETIC FLUX RESPONSIVE MEANS

[72] Inventor: Andrew Francis Vincent Leat, Ann Arbor, Mich.

[73] Assignee: Elliott Brothers (London) Limited, London, England

[22] Filed: June 15, 1970

[21] Appl. No.: 46,385

Related U.S. Application Data

[62] Division of Ser. No. 683,641, Nov. 16, 1967, abandoned.

[30] Foreign Application Priority Data

Nov. 19, 1966 Great Britain..........51,889/66

[52] U.S. Cl.................................33/357, 33/361 FA
[51] Int. Cl. .............................................G01c 17/38
[58] Field of Search ..........33/224, 225; 235/150.26; 324/43, 2, 500, 4

[56] References Cited

UNITED STATES PATENTS

| | | |
|---|---|---|
| 2,426,470 | 8/1947 | Sinks...........................33/224 |
| 2,581,428 | 1/1952 | McCarthy....................33/224 |
| 2,706,801 | 4/1955 | Tolles......................33/224 X |
| 2,753,498 | 7/1956 | Gray........................33/224 X |
| 2,852,859 | 9/1958 | Depp..........................33/225 |
| 3,040,248 | 6/1962 | Geyger........................324/43 |

FOREIGN PATENTS OR APPLICATIONS

| | | |
|---|---|---|
| 611,194 | 12/1960 | Canada........................324/47 |
| 619,525 | 3/1949 | Great Britain...............324/43 |

*Primary Examiner*—Robert B. Hull
*Attorney*—Smith, Michael, Bradford and Gardiner

[57] ABSTRACT

A fluxgate magnetometer circuit is described using a null method of indicating the magnitude and phase of a predetermined component of magnetic field lying along its axis. A correction circuit corrects the output of the fluxgate magnetometer circuit for (i) errors resulting from extraneous magnetic fields which detract from or augment a component of magnetic flux being measured, and (ii) errors due to distortion of the predetermined component of flux by the proximity of magnetizable materials.

5 Claims, 5 Drawing Figures

VEHICLE DIRECTION SENSING AND STEERING SYSTEMS USING MAGNETIC FLUX RESPONSIVE MEANS

CROSS-REFERENCES TO RELATED APPLICATIONS

This application is a divisional Application of application Ser. No. 683,641 filed on Nov. 16, 1967 now abandoned.

The invention relates to magnetic flux responsive means, and to vehicle direction sensing and steering systems using magnetic flux responsive means.

The present invention provides flux measuring apparatus for producing an electrical output dependent on the strength of a predetermined component of a magnetic field, comprising flux converting means responsive to the said predetermined component for producing an output alternating flux dependent thereon, a coil arranged to be influenced by said alternating flux to produce a corresponding alternating voltage, and means responsive to said alternating voltage for feeding back into said coil a corresponding current to set up in said coil an opposing flux tending to balance said predetermined component, the said electrical output being derived in dependence on the said corresponding current.

The present invention further provides a system responsive to the electrical outputs of at least two flux measuring apparatuses, the two apparatuses respectively producing their said outputs in dependence on the strength of magnetic field components having different directions, comprising first means for, respectively algebraically subtracting from the said outputs, components respectively representing the effects on the apparatuses of any stray magnetic fields in the vicinity of the apparatuses and second means for respectively multiplying each said output after the respective subtraction by a factor representing the distorting effect on the said magnetic flux of any magnetic material in the vicinity of the said apparatuses, whereby the sum of the resultant products represents the output of the one said apparatus which would be obtained in the absence of any said magnetic field and in the absence of any said magnetic material.

The present invention further provides a vehicle direction sensing system, comprising sensing means on the vehicle and responsive to a magnetic field in a predetermined direction in a given plane for producing a signal output representing the deviation of the vehicle in the said plane from the said predetermined direction, compensating means responsive to the attitude of the vehicle relative to the said plane and to the said signal output for producing a compensated output in which the effect on said signal output of any variation of the said attitude of the vehicle from a predetermined said attitude is offset, reference means for producing a reference output representing the reference direction of the vehicle with respect to the predetermined direction, and comparing means for comparing the said compensated output and the said reference output whereby to produce a vehicle directional error signal representing the deviation of the vehicle in the said given plane from the said reference direction.

Apparatus and systems embodying the invention will now be described by way of example, with reference to the accompanying diagrammatic drawings in which.

Figure 1:
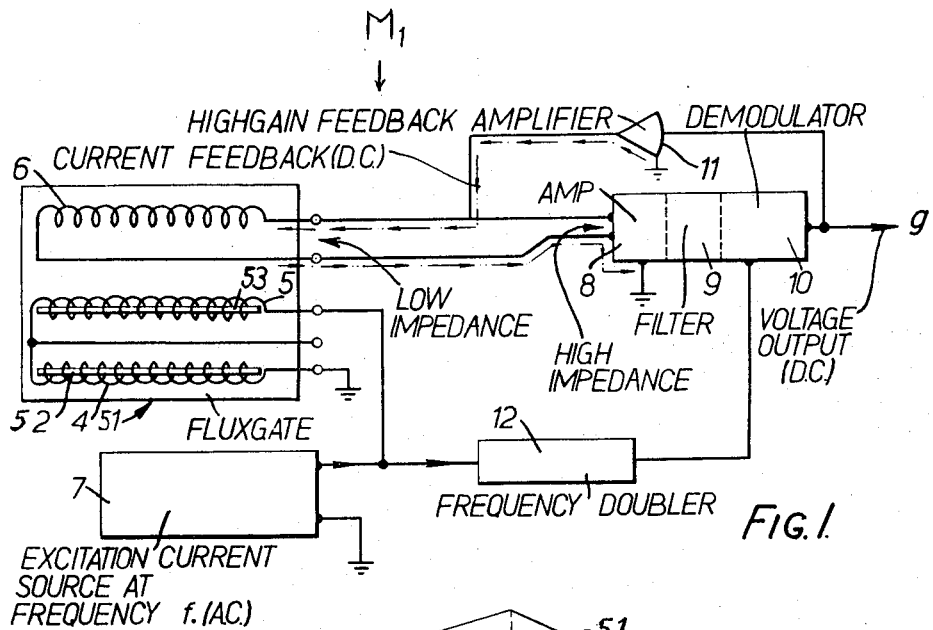
FIG. 1 is a circuit diagram of the fluxgate element showing circuitry for producing a voltage output proportional to the strength of a given component of an externally applied magnetic field.

FIG. 1 shows a fluxgate magnetometer 51 which includes a flux converting portion having two parallel highly permeable wires 52 and 53. The wire 52 is surrounded by a coil 4 connected in series with a similar coil 5 which surrounds the wire 53 but is wound in an opposite sense to coil 4. The coils 4 and 5 are connected to an alternating supply source 7 having a frequency $f$. The magnetometer 51 further includes a third coil 6 having an axis parallel to the wires 52 and 53 is positioned to provide equal magnetic coupling between the coil 6 and each one of the wires 52 and 53.

The coils 4 and 5 are energized by the supply source 7 to a value just below the point where saturation of the wires 52 and 53 occurs. When no external field is present the coils 4 and 5 produce equal and opposite magnetic fields so as to induce equal and opposite voltages in the coil 6 thus resulting in zero voltage output from the coil 6. However in the presence of an external magnetic field having a component parallel to the wires 52 and 53 periodic saturation of the wires 52 and 53 occurs as the wires are near saturation, when no external field is present.

Because of the opposite sense of windings 4 and 53, the wire 53 is saturated in each alternate half cycle of the supply output from source 7 while wire 4 is saturated in the intervening half cycles, thus providing a resultant coupling field in coil 6 having a frequency $2f$. The induced voltage output from coil 6 is fed into an amplifier 8 and from there to a filter 9 which selects the harmonic of frequency $2f$. The signal output from the filter 9 is demodulated in a phase sensitive demodulator 10 which is supplied with a phase reference signal from the output of a frequency doubler 12 fed from the supply source 7. The direct current output from the demodulator 10 is amplified in a high gain feedback amplifier 11 which feeds the amplified d.c. signal back through the coil 6 to produce a magnetic field in such a direction as to oppose the external magnetic field being measured. Therefore, the arrangement tends to a null condition in which the resultant flux in the fluxgate is zero. The d.c. output from demodulator 10 is just sufficient to enable the amplifier 11 to maintain the opposing flux in the coil 6 at the required level (which depends on the externally applied field) and hence the d.c. output of the apparatus $M_1$ is proportional to the strength $g_1$ of the component of the externally applied field axially of the fluxgate 51.

Figure 2:
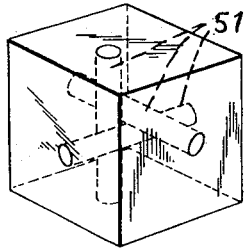
FIG. 2 shows an arrangement of fluxgate elements measuring components of a magnetic field in three perpendicular axes.

Three fluxgate elements, each as illustrated in FIG. 1, may be arranged to be mutually perpendicular as shown in FIG. 2 and will produce outputs respectively proportional to three mutually perpendicular components of a spatial magnetic field. Each fluxgate element is part of a separate magnetometer circuitry as shown in FIG. 1 (though the excitation source 7 and frequency doubler 12 may be common to the three magnetometers).

Such an arrangement of fluxgate elements as shown in FIG. 2 may be used to guide a moving vehicle relative to the earth's magnetic field. It will be appreciated, however, that when such a fluxgate element arrangement is incorporated in a vehicle, errors may occur, firstly, due to the distorting effect on the field in the vicinity of the fluxgate elements of soft iron members (referred to herein as the "soft iron effect"), and, secondly, due to the augmenting or detracting effect of magnetized iron members and electrical apparatus (referred to herein as the "hard iron effect"). According to a feature of the invention means may be provided to overcome these two effects as will now be described.

It will be assumed that the fluxgate elements are disposed in three mutually perpendicular axes 1, 2 and 3 and that $g_1$, $g_2$, and $g_3$ are the actual instantaneous output voltages from the three magnetometers respectively. It will also be assumed that $f_1, f_2$, and $f_3$ respectively represent the instantaneous output voltage which would occur if no soft and hard iron effects were present. The voltages $g_1$, $g_2$, $g_3$, $f_1$, $f_2$, and $f_3$ represent flux magnitudes along the axes 1, 2 and 3 respectively, and the soft iron effect can be considered as distorting the three flux components producing the voltages $f_1, f_2$ and $f_3$ so that only subcomponents of them lie along the axes 1, 2 and 3 and the resultant flux along each of the axes is measured by the magnetometers. Thus, the soft iron effect acts on the flux component producing the voltage $f_1$ to produce a subcomponent thereof along axis 1 which is represented by a voltage $s_{11} f_1$, and also subcomponents along the axes 2 and 3 which are respectively represented by voltages $s_{21} f_1$ and $s_{31} f_1$ in which $S_{11}$ and $S_{21}$ and $S_{31}$ are known factors which have been determined from the soft iron structure of the vehicle in which magnetometer is installed. Distortions of the other flux components produce subcomponents similarly defined, i.e., the subcomponent of the voltage $f_2$ along the axis 1 would be $s_{12} f_2$ and so on for the other subcomponents voltages $f_2$ and $f_3$.

The detraction or augmentation due to the hard iron effect are represented by terms in $h$. Thus the components due to the hard iron effect along the axes 1, 2 and 3 are $h_1$, $h_2$ and $h_3$ respectively where $h_1$, $h_2$ and $h_3$ are determined from the magnetic structure of the vehicle in which the magnetometer is installed.

The constants $h_1$, $h_2$ and $h_3$ may be at least partially derived from the voltage supplying any electrical equipment causing strong magnetic fields so as to vary in dependence on these magnetic fields.

The relationship between the voltages $g_1$, $g_2$ and $g_3$, and $f_1, f_2$ and $f_3$ can be written as:

$$g_1 = s_{11} f_1 + s_{12} f_2 + s_{13} f_3 + h_1 \quad \text{1a}$$

$$g_2 = s_{21} f_1 + s_{22} f_2 + s_{23} f_3 + h_2 \quad \text{1b}$$

$$g_3 = s_{31} f_1 + s_{32} f_2 + s_{33} f_3 + h_3 \quad \text{1c}$$

The equations 1a, 1b and 1c may be inverted to express $f_1, f_2$ and $f_3$ in terms of $g_1$, $g_2$ and $g_3$ as follows:

$$f_1 = p_{11}(g_1 - h_1) + p_{12}(g_2 - h_2) + p_{13}(g_3 - h_3) \quad \text{2a}$$

$$f_2 = p_{21}(g_1 - h_1) + p_{22}(g_2 - h_2) + p_{23}(g_3 - h_3) \quad \text{2b}$$

$$f_2 = p_{31}(g_1 - h_1) + p_{32}(g_2 - h_2) + p_{33}(g_3 - h_3) \quad \text{2c}$$

in which the coefficients $p_{11}$, $p_{12}$, etc., may be determined from the coefficients $s_{11}$, $s_{12}$, etc., by standard methods of solving simultaneous linear equations.

Figure 3:
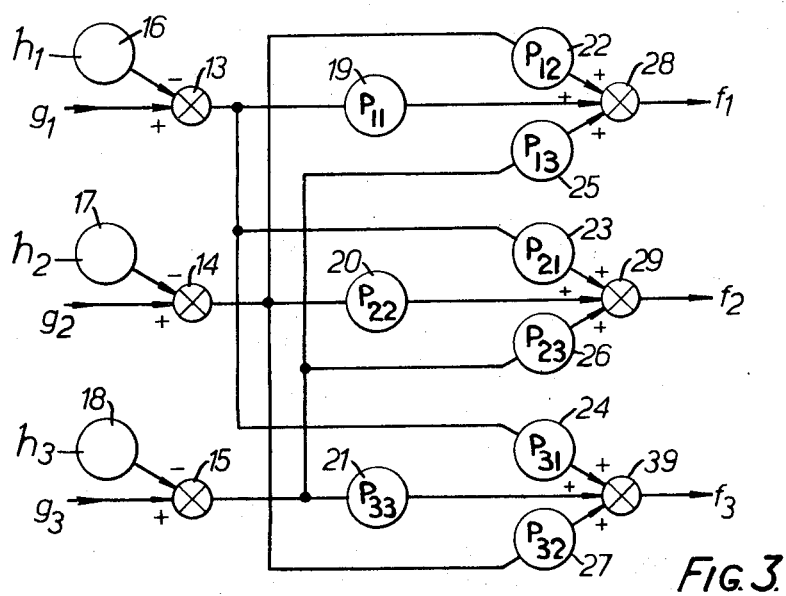
FIG. 3 shows an analogue arrangement for providing compensation to the arrangement of FIG. 2 for errors produced by spurious external fields and by soft iron members.

The analogue system in FIG. 3 solves the equations 2a, 2b and 2c so as to produce outputs accurately representative of the three mutually perpendicular components of the earth's magnetic field before it has been affected by the hard and soft iron effects.

In FIG. 3, $g_1$, $g_2$ and $g_3$ represent the voltage outputs of the three magnetometers fed into summing units 13, 14 and 15 respectively. Three sources 16, 17 and 18 are arranged to produce signals respectively representing $h_1$, $h_2$ and $h_3$ and these signals are also fed (with a negative polarity) into the summing units 13, 14 and 15 respectively.

The output from each of the summing units 13, 14 and 15 is fed into three respective multiplying units. Thus the output from summing unit 13 is fed into multiplying units 19, 23 and 24 which respectively multiply the output of the summing unit 13 by factors representing the predetermined constants $p_{11}$, $p_{21}$ and $p_{31}$, similarly, the output for summing unit 14 is fed into multiplying units 22, 20 and 27 respectively multiplying the output of the summing unit 14 by factors representing the predetermined constants $p_{12}$, $p_{22}$ and $p_{32}$, and the output from summing unit 15 is fed into multiplying units 25, 26 and 21 respectively multiplying the output of the summing unit 15 by factors representing the predetermined constants $p_{13}$, $p_{23}$ and $p_{33}$.

The system includes three further summing units 28 29 and 39 each of which is arranged to receive the outputs of three particular ones of the multiplying units 19 to 27 Thus, the summing unit 28 receives the outputs from the multiplying units 19, 22 and 25 and hence produced an output of the form of equation 2a above and therefore equal to $f_1$ as required. Similarly, the summing units 29 and 39 produce outputs respectively equal to $f_2$ and $f_3$.

The computer shown in FIG. 3 is merely exemplary and any other computer (digital, for example) arranged to perform the same operations can be used instead.

The compensated outputs of the fluxgate elements vary with deviation from magnetic north and therefore can be used in a directional indicating system or in an error-zeroing directional control system as signals representing the actual deviation of the vehicle from magnetic north; these signals can be compared with reference signals representing the difference (if any) between a reference direction and magnetic north, and the comparison can then be used in the indicating system to indicate the deviation of the vehicle from the reference direction or in the control system to tend to steer the vehicle in the reference direction.

In the embodiment to be described the direction of the vehicle is required to be indicated or controlled in a horizontal plane. The guiding magnetic field for the vehicle can be taken as the horizontal component of the earth's magnetic field. Thus, provided the vehicle is horizontal, only the compensated outputs of the two magnetometers with fluxgate elements lying in the horizontal plane and coupling with the horizontal component of the earth's magnetic field produce signals $f_1$ and $f_2$ where $f_1 = p_{11}(g_1-h_1) + p_{12}(g_2-h_2)$ and $f_2 = P_{21}(g_1-h_1) + P_{22}(g_2-h_2)$ representing the deviation of the vehicle's actual direction from the direction of the horizontal component of magnetic north. However, should the vehicle become non-horizontal, coupling of the third fluxgate element with the horizontal component of the earth's magnetic field will occur and also coupling of the first and second fluxgate elements wit the vertical component of the earth's magnetic field. In this case, the magnetometer outputs can still be compared with reference signals representing the difference between the reference direction and the horizontal component of magnetic north, provided the outputs are first resolved into the horizontal plane.

For a clearer understanding of the operation of a computer for providing an error signal which is a measure of the angle between the craft axis and a desired or reference direction, which will now be described, two axes A and B, both in the horizontal plane can be defined with B being at an angle 90° clockwise from A, and A being the horizontal projection of the axis 1 defined above, and this latter axis being the roll axis of the vehicle. Further, the axes 2 and 3 defined above will correspond respectively with the vehicle's pitch and yaw axes. It will also be assumed that the component of the earth's field in the horizontal plane is $H$ and is at an angle $Y$ from A in an anti-clockwise direction. Then the components of $H$ along axes A and B are $a$ and $b$, where $a = H \cos Y$ (3a) and $b = -H \sin Y$ (3b).

It can be shown that $a$ and $b$ for any angle of the vehicle can also be expressed in terms of $f_1, f_2$ and $f_3$, the compensated outputs of the magnetometers, as follows:

$$a = f_1 \cos \theta + f_2 \sin \phi \sin \theta + f_3 \cos \phi \sin \theta \quad 4a)$$

$$b = f_2 \cos \phi - f_3 \sin \phi \quad 4)$$

where $\phi$ is the angle of roll of the vehicle, that is, its angle as it turns about its roll axis and $\theta$ is the angle of pitch of the vehicle, that is, its angle as it turns about axis B.

Figure 4:
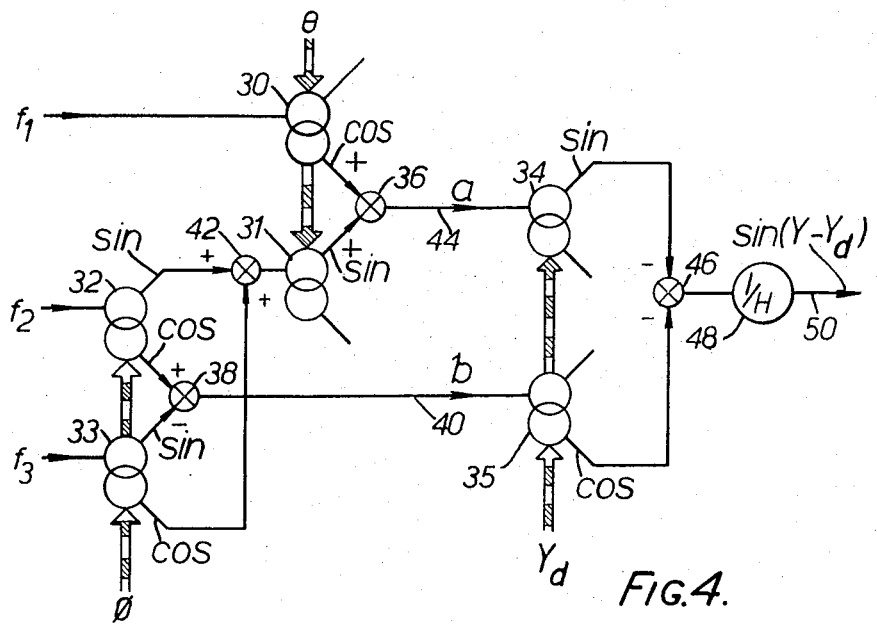
FIG. 4 shows an analogue arrangement, responsive to the output of the arrangement of FIG. 3, for producing either a directional error signal which can be used in a vehicle steering system, or a signal to be used for indicating the heading of the vehicle relative to some reference direction.

FIG. 4 shows a computer for solving equations 4a nd 4b to produce outputs proportional to $a$ and $b$. The computer then, in a manner to be described, solves equations 3a and 3b to produce $a$ and $b$ which are outputs proportional to functions of $Y$, $Y$ being the actual heading of the vehicle, and compares these outputs with an input setting representing $Y_d$, the reference heading: the error signal, representing the sine of the difference between $Y$ and $Y_d$, can be used to indicate the heading of the vehicle to the correct direction.

In FIG. 4 the inputs representing $\theta$, $\phi$ and $Y_d$ are in the form of angular positions of the shafts of resolvers 30 and 31, 32 and 33, and, 34 and 35 respectively, the inputs representing $\theta$ and $\phi$ being derived from a gyrostabilized platform for example.

The resolver 30, whose shaft is positioned according to the value of $\theta$, receives the voltage $f_1$ from the computer of FIG. 3 and hence produces an output $f_1 \cos \theta$ to a summing unit 36. The resolvers 32 and 33 whose shafts are positioned according to the value of $\theta$ receive the voltage $f_2$ and $f_3$ respectively from the computer of FIG. 3 and respectively produce outputs $f_2 \cos \phi$ and $f_3 \sin \phi$, which are fed to a summing unit 38 to produce an output on a line 40 of $f_2 \cos \phi - f_3 \sin \phi$ (which equals $b$ see equation 4b; the resolvers 32 and 33 also respectively produce two further outputs $f_2 \sin \phi$ and $f_3 \cos \phi$ which are summed in a summing unit 42 to produce an output $f_2 \sin \phi + f_3 \cos \phi$. This output is fed into resolver 31 to produce a further output, $(f_2 \sin \phi + f_3 \cos \phi) \sin \phi$, which is fed into summing unit 36: the output of the summing unit 36 on a line 44 is therefore: $(f_2 \sin \phi + f_3 \cos \phi) \cdot \sin \theta + f_1 \cos \theta$ which is equal to $a$, see equation 4a.

The outputs on lines 44 and 40 are fed into resolvers 34 and 35, whose shafts are positioned according to the value of $Y_d$, which therefore produces outputs $a \sin Y_d$ and $b \cos Y_d$. These outputs are summed together in a negative sense in a summing unit 46 to produce an output $-(a \sin Y_d + b \cos Y_d)$. From equations 3a and 3b it will be seen that this represents $H$ ($\sin Y \cdot \cos Y_d - \cos Y \cdot \sin Y_d$) and is equal to $H \sin (Y - Y_d)$.

The output from the summing unit 46 is fed into a unit 48 which divides it by a known factor representing H so that the output of the computer on a line 50 is $\sin (Y - Y_d)$ which represents the error between the actual and reference headings of the vehicle as required, and can, as explained be used to indicate the heading of the vehicle relative to the reference direction or to steer the vehicle to the desired direction.

The use of $\sin (Y - Y_d)$ as an error signal instead of $(Y = Y_d)$ has the advantage that it is easier to obtain from the fluxgate elements. In addition, under certain conditions it can provide a speedier return of the vehicle to the desired heading. For instance if $(Y - Y_d)$ is 270°, the $(Y - Y_d)$ signal applied to an error-zeroing control system would cause the vehicle to turn through 270° to bring it on course again; by using a sin $(Y - Y_d)$ signal, however, the vehicle would instead turn through 90° in the opposite direction, since the sines of angles 0° and 360° are identical. Another set of conditions where the use of sin $(Y - Y_d)$ is advantageous is where the desired heading $Y_d$ is rotating at a steady rate. If $Y_d$ had increased by several revolutions before the vehicle's control system where switched on, the vehicle would rotate many times to reach the desired heading if its control system were responsive to a simple $(Y - Y_d)$ signal: a vehicle having a control system as described, responsive to an error signal of sin $(Y - Y_d)$, would however, be unaware of any revolutions of $Y_d$ before the control system were switched on, and thus would speedily synchronize itself with the rotating desired heading direction by turning in the direction which would enable it to reach the desired direction in the shortest time.

The computer shown in FIG. 4 is merely exemplary and any other computer (all-electric, for example), arranged to perform the same operations may be used instead.

Figure 5:
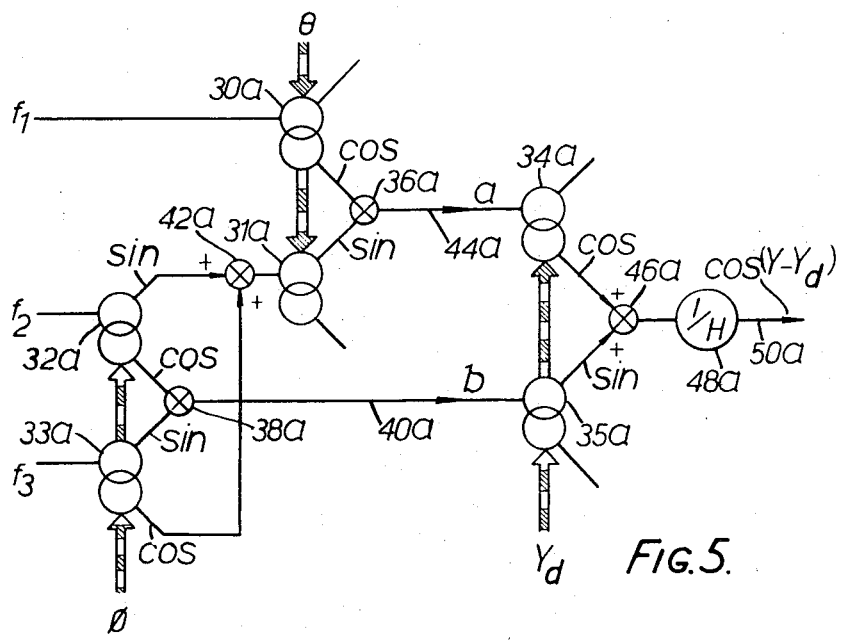
FIG. 5 shows a modified form of the arrangement of FIG. 4.

For driving a directional error indicating instrument (a compass-type instrument, for example), a cos $(Y - Y_d)$ signal may be required as well as or instead of the sin $(Y - Y_d)$ signal. An arrangement providing a cos $(Y - Y_d)$ signal is shown in FIG. 5; items similar to those in FIG. 4 being similarly referenced but with a subscript $a$.

I claim:

1. A system responsive to the electrical outputs of at least a first and a second flux measuring apparatus, said first apparatus producing an output representative of the magnetic field strength in a first direction and said second apparatus producing an output representative of the magnetic field strength in a second direction, said system comprising first signal generating means providing an output representing the modifying effect on said first apparatus output of those components of stray magnetic fields lying along said first direction, second signal generating means providing an output representing the modifying effect on said second apparatus output of those components of stray magnetic fields lying along said second direction, first subtracting means, first means feeding the output of said first apparatus and the output of said first signal generating means to said first subtracting means to produce an output from said first subtracting means representative of the difference between the outputs of said first apparatus and said first signal generating means, second subtracting means, second means feeding the output of said second apparatus and the output of said second signal generating means to said second subtracting means to produce an output from said second subtracting means representative of the difference between the outputs of said second apparatus and said second signal generating means, first multiplying means having a first multiplying factor third means feeding the output of said first subtracting means to said first multiplying means, to produce an output from said first multiplying means representative of the product of said first multiplying factor and the output of said first subtracting means,, second multiplying means having a second multiplying factor, fourth means feeding the output of said second subtracting means to said second multiplying means to produce an output from said second multiplying means representative of the product of said second multiplying factor and the output of said second subtraction means, third multiplying means having a third multiplying factor, fifth means feeding the output of the first subtracting means to the third multiplying means to produce an output from the third multiplying means representative of the product of the third multiplying factor and the output of the first subtracting means fourth multiplying means having a fourth multiplying factor, sixth means feeding the output of the second subtracting means to the fourth multiplying means to produce an output from the fourth multiplying means representative of the product of the fourth multiplying factor and the output of the second subtracting means first and second summing means, seventh means feeding the outputs of said first and fourth multiplying means to said first summing means, the first and fourth multiplying factors being a function of a known distortion of the magnetic field in which the system lies such that the output from the first summing means is representative of the output from one said apparatus corrected for the magnetic modifying and distorting effects, and eighth means feeding the outputs of the second and third multiplying meaNs to the second summing means, the second and third multiplying factors being a function of the said known distortion such that the output of the second summing means is representative of the output from the other said apparatus corrected for the modifying and distorting effects.

2. A system according to claim 1 wherein each said flux measuring apparatus comprises, magnetic flux converting means producing an alternating magnetic field in dependence on the said magnetic field strength in the corresponding said direction a coil, means mounting said coil in said alternating magnetic field, means responsive to the output of said coil to produce a corresponding current varying in dependence on the output of the coil, means for feeding said current to said coil to tend to produce a magnetic field therein equal and opposite to said predetermined component, and means responsive to said corresponding current to produce an electrical output dependent on the said magnetic field strength in the said corresponding direction.

3. A system according to claim 2 wherein said flux converting means comprises a first magnetically permeable member a first coil mounted on said first magnetically permeable member a second magnetically permeable member a second coil mounted on said second magnetically permeable member, means mounting said first coil and first magnetically permeable member at right angles with respect to said second coil and second magnetically permeable member for equal mutual magnetic coupling along a direction parallel to a said corresponding direction, an alternating current source, and means connecting said first and second coils to be supplied respectively in anti-phase by said source, whereby said first and second coils produce zero resultant field when the said magnetic field strength in the corresponding direction is zero, and said alternating current source co-operating to cause periodic of each said magnetic member in turn to produce said alternating magnetic field.

4. A system according to claim 1, including sensing means responsive to the electrical input applied to electrical equipment producing variations of said stray magnetic fields, to produce a control signal, and means connecting the first and second multiplying means to the sensing means to receive the control signal, and in which, the first and second multiplying means respectively include means responsive to the control signal to set their respective multiplying factors.

5. A system according to claim 1, additionally responsive to the electrical output of a third flux measuring apparatus, said third flux measuring apparatus producing an output representative of the magnetic field strength in a third direction, said first, second and third directions being mutually perpendicular, said system including third signal generating means providing an output representing the modifying effect on said third apparatus output of those stray magnetic field components lying along said third direction, third subtracting means, eighth means feeding the output of said third apparatus and the output of said third signal generating means to said third subtracting means to produce an output from said third subtracting means representative of the difference between the outputs of said third apparatus and said third signal generating means, fifth and sixth multiplying means respectively having fifth and sixth multiplying factors ninth means for feeding the output of the first and second subtracting means respectively to the fifth and sixth multiplying means to produce outputs from the fifth and sixth multiplying means respectively representative of the product of the output of the first subtracting means and the fifth multiplying factor and of the product of the output of the second subtracting means and the sixth multiplying factor and for feeding the outputs of the fifth and sixth multiplying means to be additionally summed respectively in the first and second summing means, seventh, eighth and ninth multiplying means respectively having seventh, eighth and ninth multiplying factors tenth means for feeding the outputs of the first, second and third subtractions means respectively to the seventh eighth and ninth multiplying means to produce outputs respectively representative of the product of the output of the first subtracting means and the seventh multiplying factor the product of the output of the second subtracting means and the eighth multiplying factor, and the product of the output of the third subtracting means and the ninth multiplying factor, third summing means, and eleventh means feeding the outputs of the seventh, eighth and ninth multiplying means to the third summing means to produce an output from the third summing means representative of the output of the third flux measuring apparatus connected for the magnetic modifying and distorting effects.

* * * * *